United States Patent
Randolph et al.

(10) Patent No.: US 12,014,053 B2
(45) Date of Patent: Jun. 18, 2024

(54) PROACTIVE TRAFFIC SHAPING WITH SERVICE LEVELS

(71) Applicant: Dell Products, L.P., Hopkinton, MA (US)

(72) Inventors: Benjamin A. F. Randolph, Uxbridge, MA (US); Narasimha Challa, Hopkinton, MA (US); Jaeyoo Jung, Shrewsbury, MA (US)

(73) Assignee: Dell Products, L.P., Hopkinton, MA (US)

( * ) Notice: Subject to any disclaimer, the term of this patent is extended or adjusted under 35 U.S.C. 154(b) by 129 days.

(21) Appl. No.: 17/981,390

(22) Filed: Nov. 5, 2022

(65) Prior Publication Data
US 2024/0152277 A1     May 9, 2024

(51) Int. Cl.
*G06F 3/06*     (2006.01)
(52) U.S. Cl.
CPC .......... *G06F 3/0613* (2013.01); *G06F 3/0604* (2013.01); *G06F 3/0653* (2013.01); *G06F 3/067* (2013.01)
(58) Field of Classification Search
CPC .... G06F 3/0613; G06F 3/0604; G06F 3/0653; G06F 3/067
See application file for complete search history.

(56) References Cited

U.S. PATENT DOCUMENTS

| | | | |
|---|---|---|---|
| 7,372,814 B1* | 5/2008 | Chiruvolu | H04L 47/10 370/235 |
| 2007/0171830 A1* | 7/2007 | Vulkan | H04L 47/39 370/235 |
| 2009/0222573 A1* | 9/2009 | Grossner | H04L 47/263 709/235 |
| 2023/0096280 A1* | 3/2023 | Zhang | H04L 43/0876 709/224 |
| 2023/0221874 A1* | 7/2023 | Markuze | G06F 3/064 711/154 |

* cited by examiner

*Primary Examiner* — Nicholas J Simonetti
(74) *Attorney, Agent, or Firm* — Anderson Gorecki LLP

(57) ABSTRACT

Proactive traffic shaping is used to generate and transmit proactive QFULL messages that are selectively sent to hosts that are generating large numbers of IO operations with lower service levels in instances where a compute node is experiencing high IO volume. By sending proactive QFULL messages only to hosts that are sending IO operations with lower service levels, it is possible to cause the lower priority IO operations to be directed by the hosts to other compute nodes within the storage system, to thereby balance IO operations between compute nodes and enable higher priority IO operations to be serviced with lower latency. When a low priority IO operation arrives, a determination is made as to the depth of the queue. If the number of IO operations in the queue is above a threshold, and IOS are trending upward, a QFULL message is sent to the low priority IO initiator.

20 Claims, 8 Drawing Sheets

Nominal IO workload

Load unbalanced on host A

Load rebalanced to host B

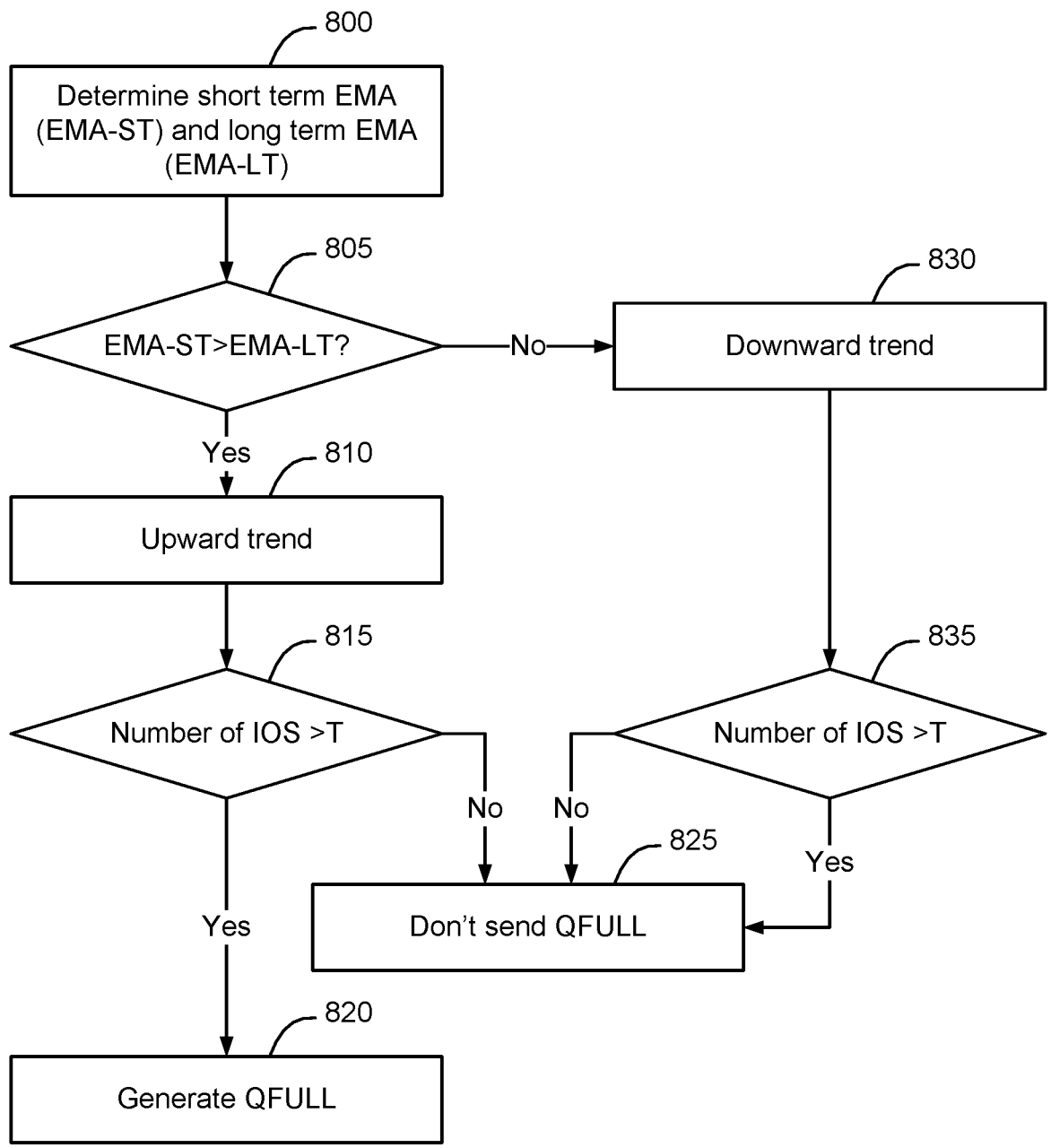

PROACTIVE TRAFFIC SHAPING WITH SERVICE LEVELS

FIELD

This disclosure relates to computing systems and related devices and methods, and, more particularly, to proactive traffic shaping with service levels.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A Storage Area Network (SAN) array may have thousands of sessions—connections from hosts to the front-end ports of a given storage director. For example, assume that a given storage array supports 1024 fabric connections per port, and each connection has its own LUN list that is pre-configured, with each LUN being assigned to a particular service level. Assume that array can only support 4096 outstanding IO operations at a particular time and stay within its resource limit. Due to issues beyond the array's control, workload imbalances across directors are known to occur. Customers who are using Service Levels to define their high priority workloads may be frustrated when low priority IO operations overwhelm the queue resources before QOS/SL can help. For example, during periods of high traffic, the storage array may be required to accept all IO operations, even IO operations from lower service levels, which can cause workloads with high service levels to experience increased response times due to sheer IO volume.

According to some embodiments, proactive traffic shaping is used to generate and transmit proactive QFULL messages that are selectively sent to hosts that are generating large numbers of IO operations with lower service levels in instances where a compute node is experiencing high IO volume. By sending proactive QFULL messages only to hosts that are sending IO operations with lower service levels, it is possible to cause the lower priority IO operations to be directed by the hosts to other compute nodes within the storage system, to thereby balance IO operations between compute nodes and enable higher priority IO operations to be serviced with lower latency.

BRIEF DESCRIPTION OF THE DRAWINGS

FIG. 8 example process of using proactive QFULL messages to implement proactive traffic shaping for traffic having specific service levels based on EMA IO trends, according to some embodiments, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
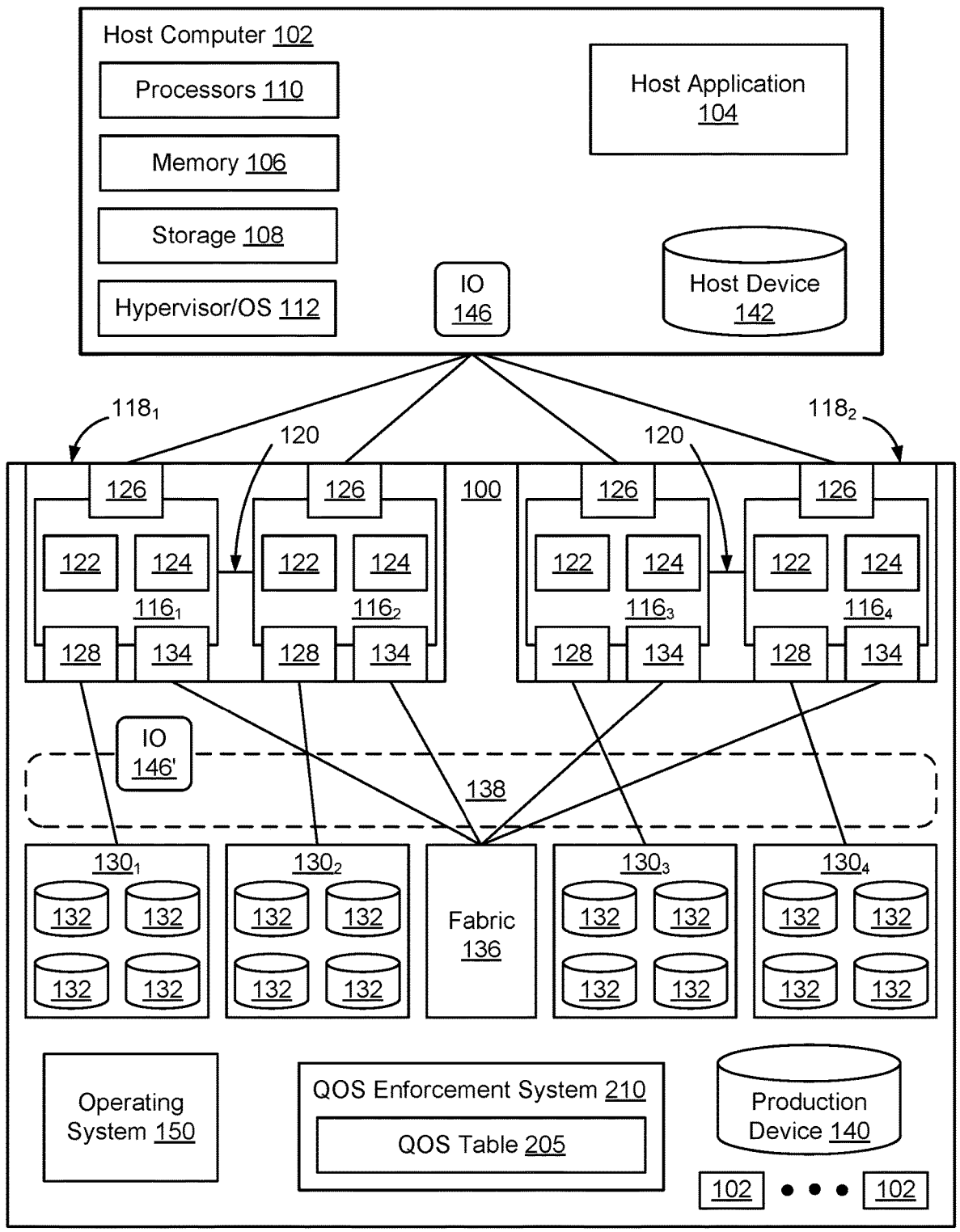
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

A Storage Area Network (SAN) array may have thousands of sessions—connections from hosts to the front-end ports of a given storage director. For example, assume that a given storage array supports 1024 fabric connections per port, and each connection has its own LUN list that is pre-configured, with each LUN being assigned to a particular service level. Assume that array can only support 4096 outstanding IO operations at a particular time and stay within its resource limit. Due to issues beyond the array's control, workload imbalances across directors are known to occur. Customers who are using Service Levels to define their high priority workloads may be frustrated when low priority IO operations overwhelm the queue resources before QOS/SL can help. For example, during periods of high traffic, the storage array may be required to accept all IO operations, even IO operations from lower service levels, which can cause workloads with high service levels to experience increased response times due to sheer IO volume.

According to some embodiments, proactive traffic shaping is used to generate and transmit proactive QFULL messages that are selectively sent to hosts that are generating large numbers of IO operations with lower service levels in instances where a compute node is experiencing high IO volume. By sending proactive QFULL messages only to hosts that are sending IO operations with lower service levels, it is possible to cause the lower priority IO operations to be directed by the hosts to other compute nodes within the storage system, to thereby balance IO operations between compute nodes and enable higher priority IO operations to be serviced with lower latency. By using proactive QFULL messages, it is possible to protect high priority IO operations from encountering resource shortages and to more equally balance out the queue depth across multiple compute nodes 116 on the array.

According to some embodiments, a storage array can selectively send QFULL to hosts/LUN of lower service level (e.g., Bronze) initiators to provide better QoS and performance to high service level (e.g., Diamond) users. When an IO arrives, in some embodiments the compute node 116 checks for low priority Service Level (SL), queue depth, and the short-term and long-term Exponential Moving Averages (EMAs) to determine if this workload is sustainable under the current capacity limit. Using short/long EMAs and linear regression, the system determines workload trends to determine whether the system resources are overloaded and, if overloaded, whether the IO trends as specified by the short and long-term EMAs indicate that the system resources are likely to recover sufficiently to enable the compute node to service all IOs in timely fashion. The compute node 116 also is aware if there are other compute nodes that have capacity to take more IO load.

If a repeated pattern of low priority IO operations continues to overload the system, then the controller will send QFULL to the low priority IO initiator. As long as port queue depth is maintained under the system capacity limit, high priority IO will be queued in a predictable and efficient manner. The array continues to monitor EMA and linear regression downtrend. When performance stabilizes, the array will stop sending QFULL back to the offending nodes and low priority IO operations will get queued into the array and served under its goal.

In some embodiments, QFULL commands are used to protect the read/write transactional IO operations, by causing hosts to limit transmission of data IO operations, but sending QFULL messages does not prevent hosts from sending other admin type of commands like Automatic Test and Set (ATS), Test Unit Ready (TUR), and Persistence Group Reservation (PGR). These type of control commands are not affected from the service level even for the low-level service entities. This is why proactive QFULL leaves room to provide for those special commands to be served w/o having the path required to be reinstated, which is very disruptive for mission critical applications.

If a storage system's queues become sufficiently full, the front-end port adapter of the storage system will respond with a queue-full (QFULL) flow control command. In some embodiments, a host bus adapter will generate a QFULL and send the QFULL to the host. Depending on the HBA used by the host, when a host receives a QFULL command, it will pause IO operations on the link for a period of time, such as for a second.

Figure 2:
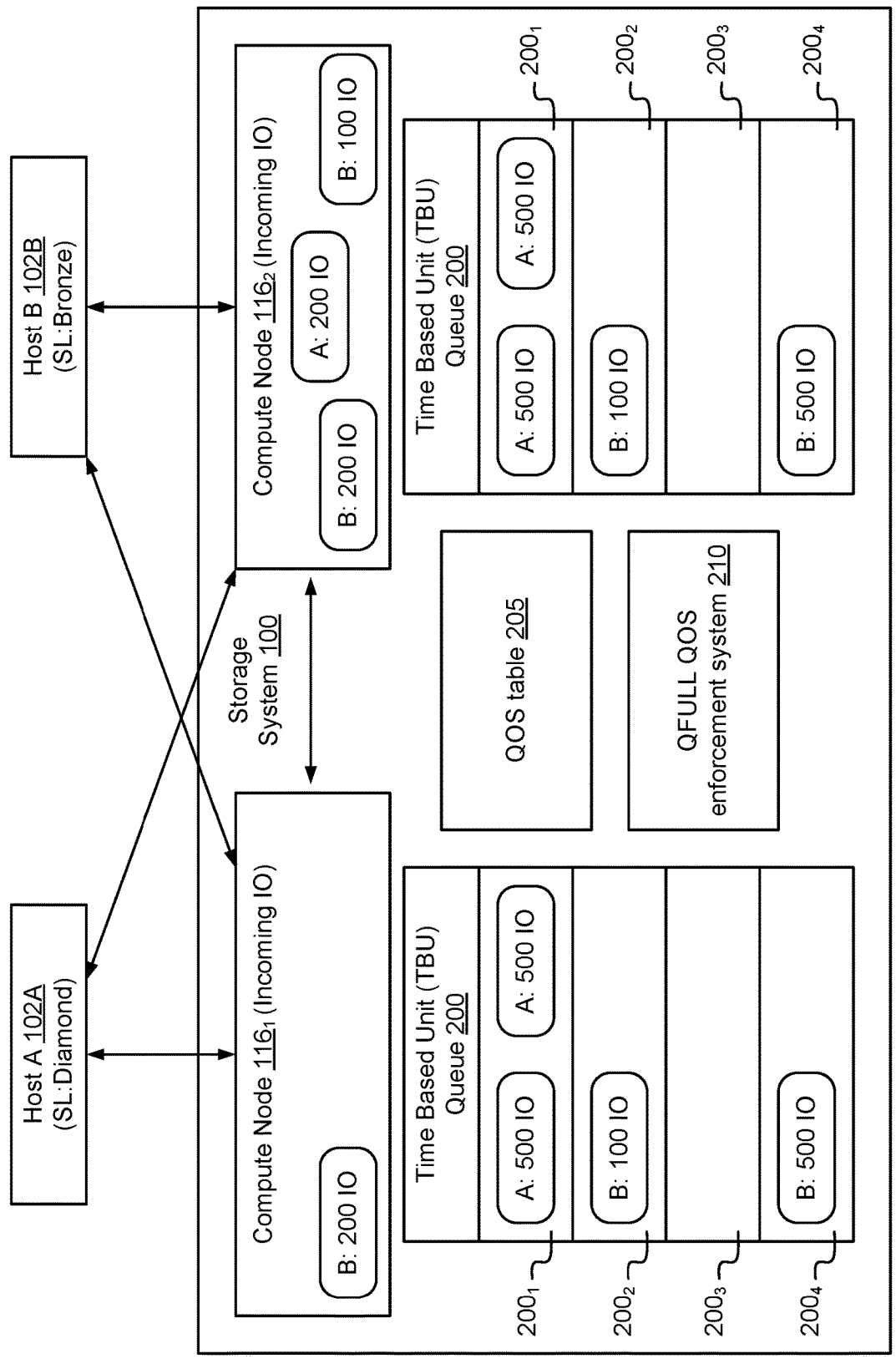
FIG. 2 is a functional block diagram illustrating an example storage environment including a plurality of hosts connected to a storage system having two compute nodes, in which the hosts are providing a manageable amount of IO operations to the compute nodes, according to some embodiments.
Figure 3:
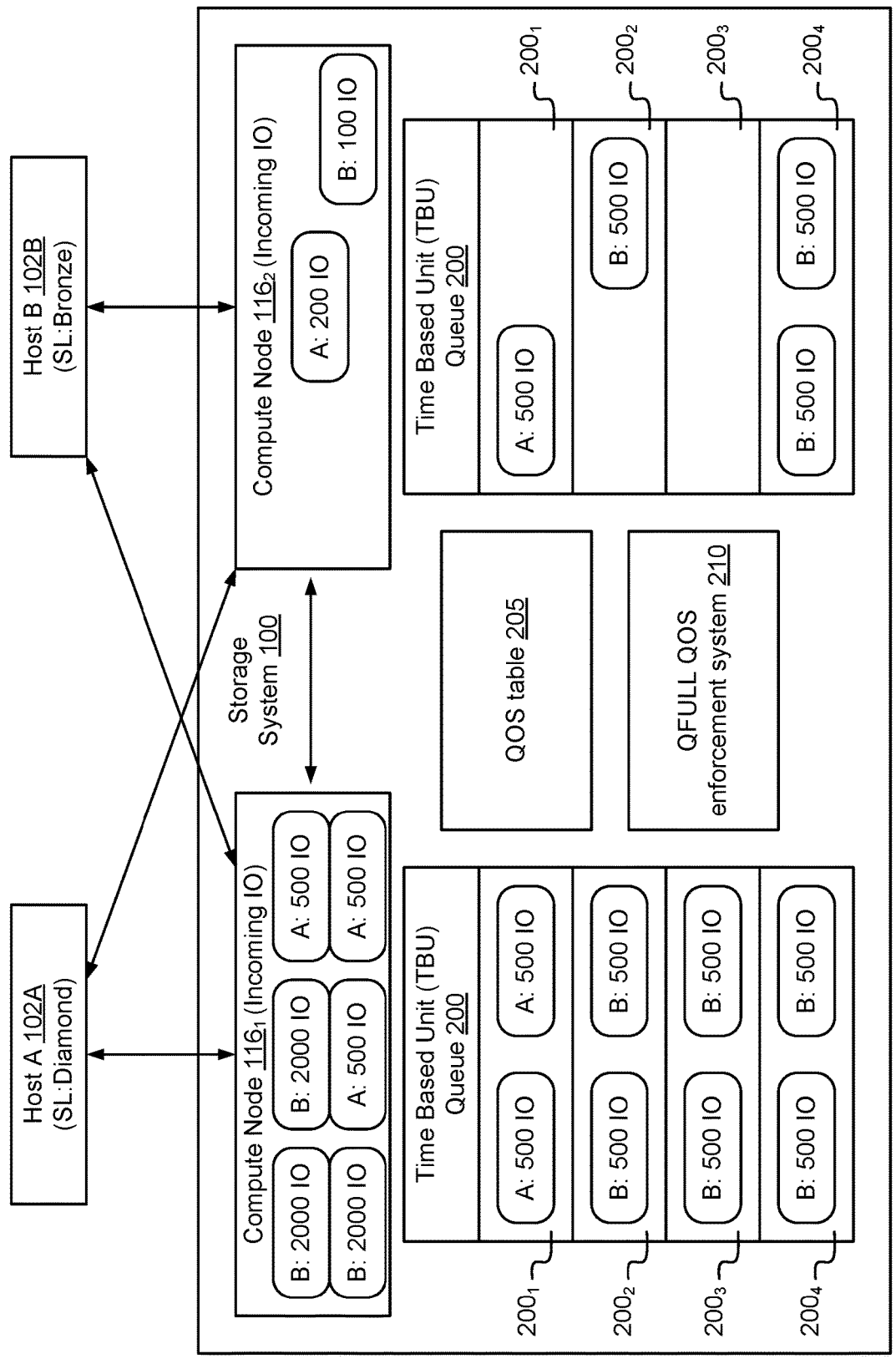
FIG. 3 is a functional block diagram illustrating an example storage environment including a plurality of hosts connected to a storage system having two compute nodes, in which the hosts are providing an unbalanced number of IO operations to the compute nodes and overloading one of the compute nodes, according to some embodiments.
Figure 4:
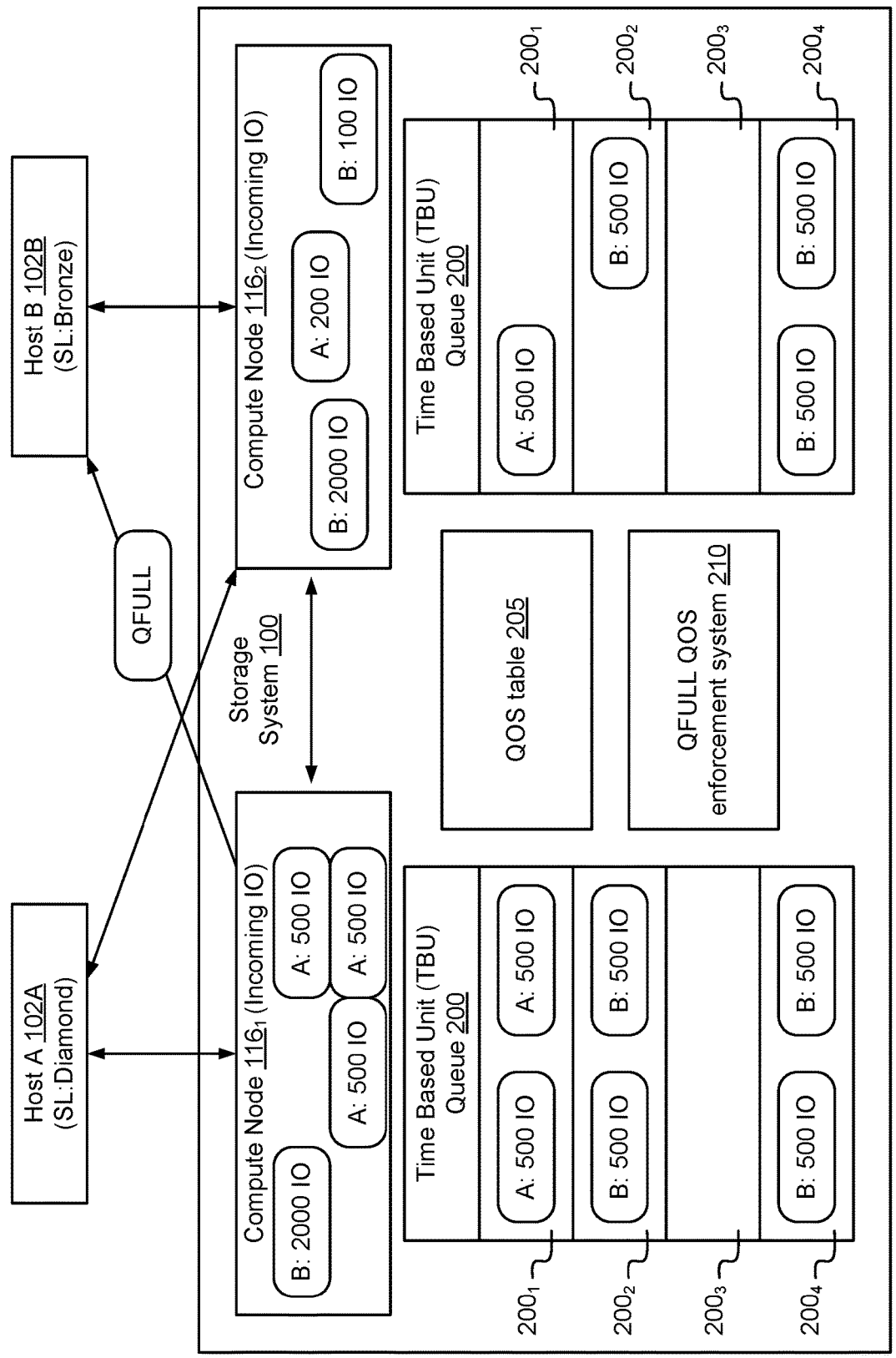
FIG. 4 is a functional block diagram illustrating an example storage environment including a plurality of hosts connected to a storage system having two compute nodes, in which an overloaded compute node uses proactive QFULL process to rebalance lower priority IO operations to the second compute node, according to some embodiments.

FIG. 2 is a functional block diagram illustrating an example storage environment including a plurality of hosts 102 connected to a storage system 100 having two compute nodes $116_1$, $116_2$, in which the hosts 102 are providing a manageable amount of IO operations to the compute nodes, according to some embodiments. As shown in FIG. 2, different hosts (host A and host B) are configured to have different service levels (SL). Example service levels shown in FIG. 2 include Diamond (host A) and Bronze (host B), although it should be understood that multiple different service levels might be provided to the hosts depending on the implementation. Different service levels might be used to specify different processing times that the storage system 100 is required to implement for IO operations associated with the different service levels. In FIGS. 2-4, it is assumed that Diamond is a higher service level than Bronze, and accordingly the storage system 100 is required to respond to IO operations from host A more quickly than the storage system 100 is required to respond to IO operations from host B. Although only two hosts and two compute nodes are shown in FIGS. 2-4 for simplicity, it should be understood that a given storage system 100 may be connected to thousands of hosts 102 and that the storage system 100 might have multiple compute nodes 116.

As shown in FIG. 2, in some embodiments all incoming IO operations from the hosts 102A, 102B are accepted by a given compute node 116. In some embodiments, each compute node maintains a Time-Based Unit (TBU) Queue 200 that is implemented using a set of queues $200_1$, $200_2$, $200_3$, $200_4$. Incoming IO operations are mapped to the queues $200_1$, $200_2$, $200_3$, $200_4$ based on the latency targets of the service levels associated with the IO operations. For example, queue $200_1$ might have a latency target of 1 ms, queue $200_2$ might have a latency target of 1.5 ms, etc. Although an example TBU 200 is shown as having four time-based queues $200_1$, $200_2$, $200_3$, $200_4$, it should be understood that other structures might be used to provide differential service to IO operations having different service levels.

In FIG. 2, host A and host B are providing a nominal amount of IO workload such that the set of compute nodes $116_1$, $116_2$ are able to handle all IO operations while meeting the service level targets. FIG. 3 shows a situation, by contrast, in which host B has flooded compute node $116_1$ with excessive lower priority IO operations. In situations where a compute node 116 receives excessive incoming workload, the compute node 116 is required to accept all IO operations into its TBU queue 200. However, as shown in FIG. 3, in some situations excessive IO operations from hosts with lower service levels can prevent the compute node from meeting its service level obligations to hosts with higher service levels. Specifically, as shown in FIG. 3, in some instances one compute node $116_1$ can be receiving a disproportionate amount of IO operations that are associated with lower service level, while another compute node $116_2$ has a much lower normal workload. Filling up the memory of compute node $116_1$ can cause compute node $116_1$ to not be able to meet its service level obligations to higher priority traffic. Accordingly, in some situations, the mere existence of excessive lower priority IO operations can cause higher priority IO operations to be delayed.

According to some embodiments, as shown in FIG. 4, the storage engine 118 includes a QOS table 205 and a QFULL QOS enforcement system 210. In instances where a particular compute node 116 has reached a state where the number of IO operations is affecting or is likely to start to affect the compute node's ability to service high priority traffic according to the agreed service level metrics, the QFULL QOS enforcement system 210 determines from QOS table 205 which hosts are associated with lower service levels, and transmits a QFULL to one or more of the particular hosts that are generating IO operations with lower service levels.

Transmitting a QFULL to a particular host will cause the host to pause transmission of IO operations on the connection to the port where the QFULL was generated, thereby causing the host 102 to look to redirect the IO operations to another port. For example, in FIG. 3, node B has a lower service level and is transmitting a large number of IO operations to compute node $116_1$. As shown in FIG. 4, when compute node $116_1$ transmits a QFULL message to host B, host B will temporarily stop sending IO operations to compute node $116_1$ and instead send its IO operations to compute node $116_2$. In this manner it is possible to selectively move lower priority IO operations from particular hosts between compute nodes 116 of a storage engine.

Figure 5:
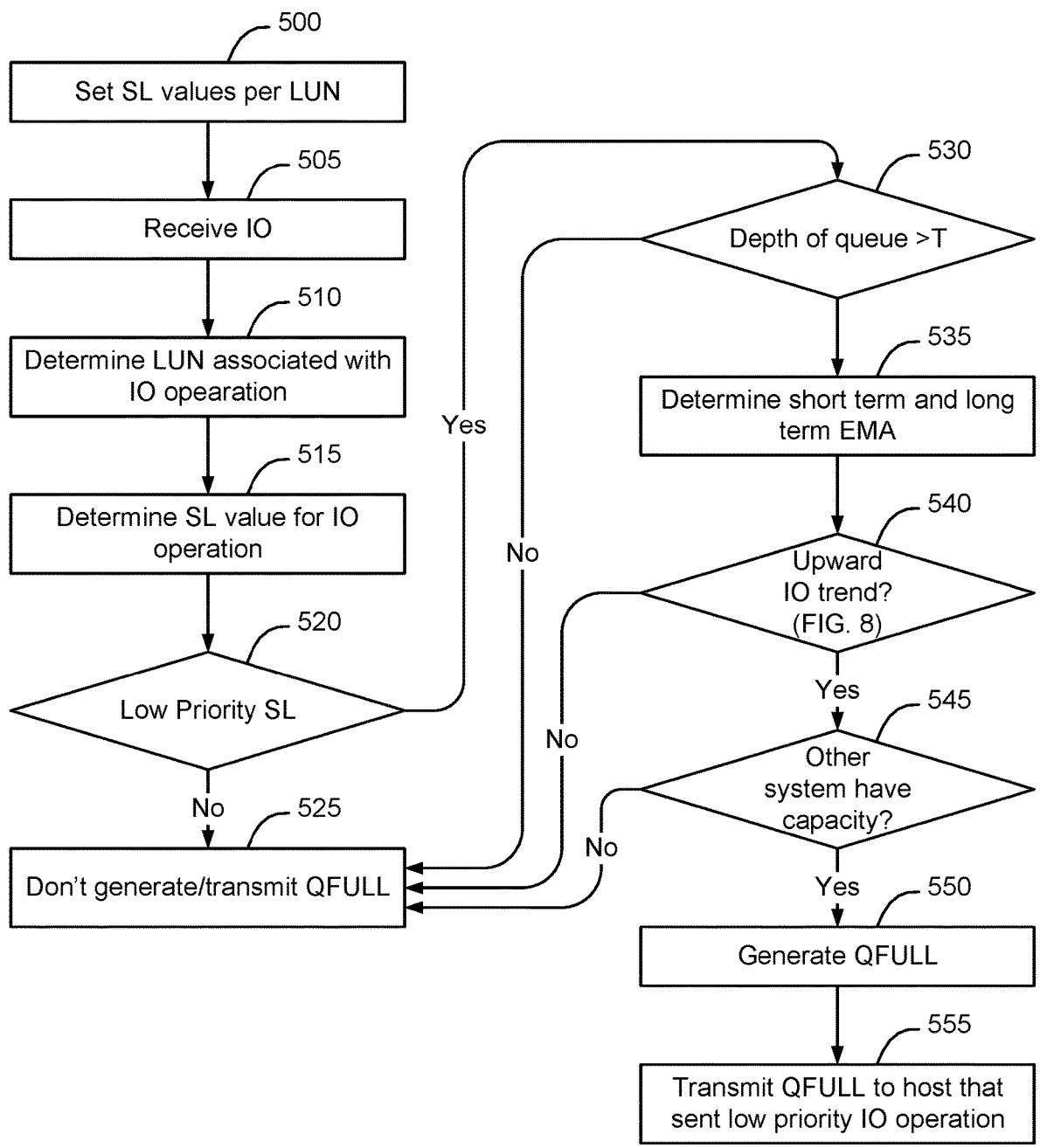
FIG. 5 is a flow chart of an example process of using proactive QFULL messages to implement proactive traffic shaping for traffic having specific service levels, according to some embodiments.

FIG. 5 is a flow chart of an example process of using QFULL messages to implement proactive traffic shaping for traffic having specific service levels, according to some embodiments. As shown in FIG. 5, in some embodiments service level values are set per LUN (Logical Unit Number) (block 500). A LUN is a unique identifier for designating an individual or collection of physical or virtual storage devices that execute input/output commands with a host computer. A particular host might issue IO operations on a single LUN or might issue IO operations on a set of LUNs. Each LUN is associated with a particular service level. The service level, in some embodiments, specifies a response time required by the storage system to respond to IO operations associated with the service level. In some embodiments, the QOS table 205 contains entries associating LUNs with respective service levels.

When an IO is received (block 505), the LUN associated with the IO operation is determined (block 510), and used to determine the service level (SL) for the IO operation (block 515). Other ways of determining the service level associated with the IO operation may be used as well, depending on the implementation. A determination is then made if the IO operation is associated with a low priority service level (block 520). If the IO operation is not associated with a low priority service level (a determination of NO at block 520) the QFULL QOS enforcement system 210 does not generate/transmit a QFULL to the host that sent the IO operation (block 525). In some embodiments, the low priority service level is determined to include a subset of all service levels, but not including the highest service level.

If the IO is associated with a low priority service level (a determination of YES at block 520) the QFULL QOS enforcement system 210 checks the depth of the queue (block 530). The depth of the queue (block 530) specifies the current number of IO operations that are currently pending at the compute node 116 where the IO operation was received. For example, in some embodiments the depth of the queue is based on the number of IO operations pending in the TBU queue 200.

In some embodiments, checking the depth of the queue comprises determining a percentage number of IO operations stored in the TBU queue 200, by comparing the current number of IO operations pending in the TBU queue with a capacity of the TBU queue. If the queue depth is not above a particular threshold percentage value T (a determination of NO at block 530) QFULL QOS enforcement system 210 does not generate/transmit a QFULL to the host that sent the IO operation (block 525). In some embodiments, the threshold value T is different for different service levels. For example, IO operations with the lowest service level may have a queue depth threshold value of 50%, whereas IO operations with a higher service level may have a queue depth threshold value of 70%. Accordingly, although FIG. 5 shows some embodiments in which a single threshold is being used, it should be understood that the QFULL QOS enforcement system 210 may use different thresholds to differentiate between IOs having different service levels.

If the queue depth is above a particular threshold percentage value T (a determination of YES at block 530), the QFULL QOS enforcement system 210 determines the short-term and long-term exponential moving averages of overall number of IO operations on the compute node (block 535).

The short-term exponential moving average (block 535) is computed based on the number of IO operations queued for processing on a compute node, for example in the TBU queue 200, in preceding sets of monitoring intervals. For example, the short-term exponential moving average may be computed based on the number of IO operations queued for processing in a relatively small number of recent monitoring intervals to thereby provide an estimate of the number of IO operations that have been recently queued for processing by the compute node 116. The long-term exponential moving average is computed based on the number of IO operations queued for processing in a larger number of preceding monitoring intervals, and thus contains information about IO trend over a longer period of time.

Figure 6:
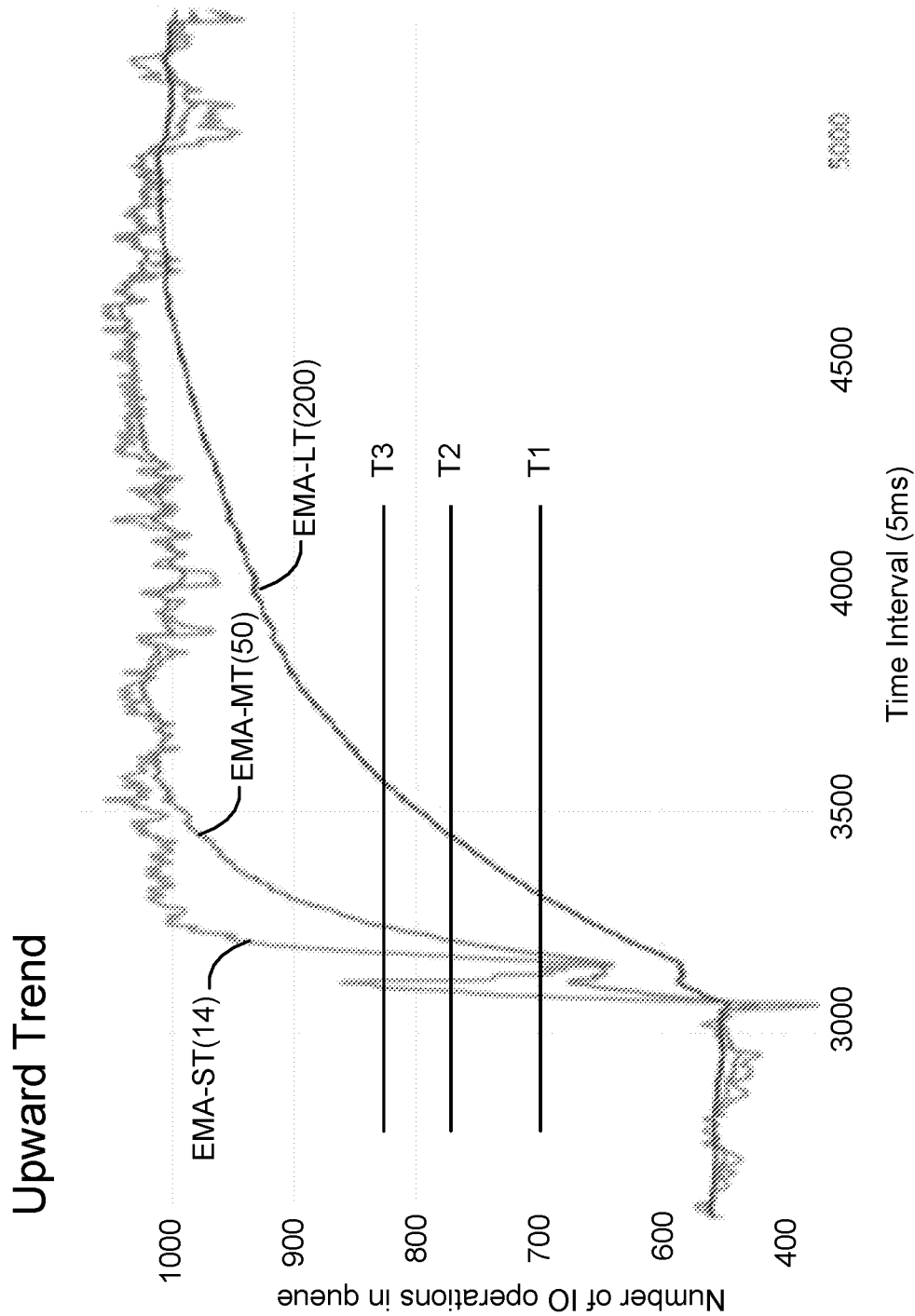
FIG. 6 is a graph of an upward trending IO count over time, in which a short-term Exponential Moving Average (EMA) number of IO operations in the queue is higher than a long-term EMA number of IO operations in the queue, according to some embodiments.
Figure 7:
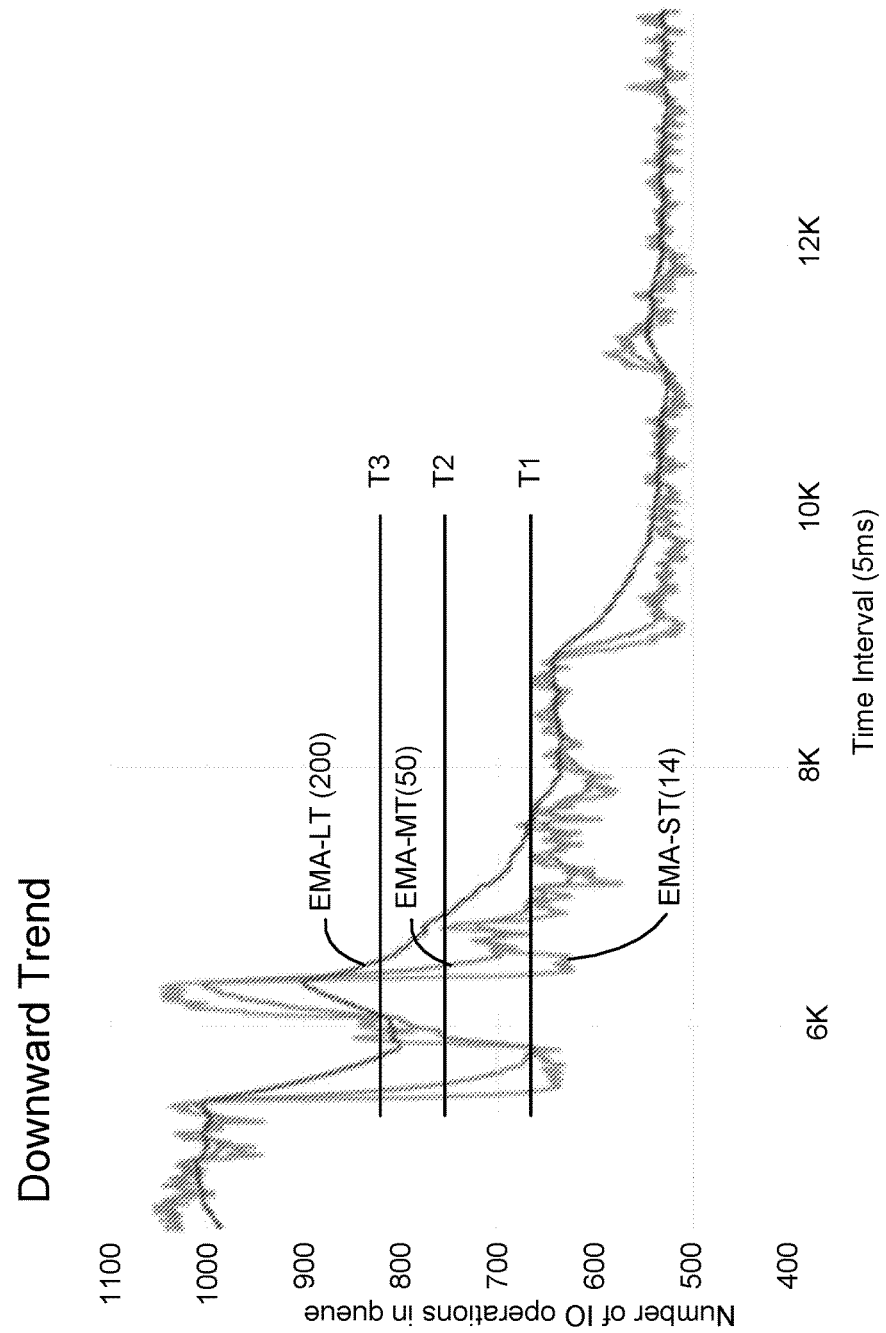
FIG. 7 is a graph of a downward trending IO count over time, in which a short-term Exponential Moving Average (EMA) number of IO operations in the queue is lower than a long-term EMA number of IO operations in the queue, according to some embodiments.

FIG. 6 is a graph of an upward trending IO count over time, in which a short-term exponential moving average number of IO operations in the queue (EMA-ST) is higher than a long-term exponential moving average number of IO operations in the queue (EMA-LT): (EMA-ST>EMA-LT), according to some embodiments. FIG. 7 is a graph of a downward trending IO count over time, in which a short-term exponential moving average number of IO operations in the queue (EMA-ST) is lower than a long-term exponential moving average number of IO operations in the queue (EMA-LT): (EMA-ST<EMA-LT), according to some embodiments.

For example, as shown in FIGS. 6 and 7, an example IO monitoring interval may be on the order of 5 ms, and the short-term exponential moving average (EMA-ST) may be calculated based on the number of IO operations queued for processing in a small number of recent monitoring intervals, such as the previous 14 monitoring intervals. Other numbers of monitoring intervals may be used to calculate the EMA-ST based on the particular implementation. The long-term exponential moving average (EMA-LT) may be calculated based on the number of IO operations queued for processing in a larger number of recent monitoring intervals, such as the previous 200 monitoring intervals. Other numbers of monitoring intervals may be used to calculate the EMA-LT based on the particular implementation. FIGS. 6 and 7 also show an example mid-term exponential moving average (EMA-MT) which may be calculated, for example, based on the previous 50 monitoring intervals.

FIG. 6 shows an example graph of an upward trending IO count over time, comparing short-term Exponential Moving Average (EMA-ST) value of the number of enqueued IO operations on a compute node, with longer-term EMA (EMA-LT) value of the number of enqueued IO operations on a compute node, according to some embodiments. As shown in FIG. 6, the short-term EMA values (EMA-ST) are more volatile and reactionary to current fluctuations in the number of IO operations queued for processing. The long-term EMA values (EMA-LT) is less influenced by recent spikes in IO operations. By comparing the short-term EMA value of the number of enqueued IO operations on a compute node with the long-term EMA value of the number of enqueued IO operations on a compute node, it is possible to determine if the current IO operations are increasing or decreasing. Specifically, as shown in FIG. 6, if the short-term EMA value of the number of enqueued IO operations on a compute node is higher than the long-term EMA value of the number of enqueued IO operations on a compute node, (EMA-ST>EMA-LT), the compute node is experiencing an upward trending IO count over time. By contrast, as shown in FIG. 7, if the short-term EMA value of the number of enqueued IO operations on a compute node is lower than the long-term EMA value of the number of enqueued IO operations on a compute node, (EMA-ST<EMA-LT) the compute node is experiencing an downward trending IO count over time.

In some embodiments, if the depth of the queue is above a particular threshold T (a determination of YES at block 530), and the EMA values indicate that the IO operations are trending upward (a determination of YES at block 540), the QFULL QOS enforcement system (optionally) determines if other compute node within the storage system has capacity (block 545). If another system has capacity (a determination of YES at block 545), the QFULL QOS enforcement system generates a QFULL (block 550) and transmits the QFULL to the host that sent the IO operation (block 555). By contrast, upon making a determination that the depth of the queue for the service level is sufficiently low (a determination of NO at block 530), or that the EMA values do not show an upward trend (a determination of NO at block 540), or upon making a determination that no other compute node has additional capacity (a determination of NO at block 545), the QFULL QOS enforcement system 210 does not generate/transmit a QFULL to the host that generated the IO (block 525).

In some embodiments, transmitting a QFULL (block 550) directs a particular host to temporarily stop sending IO operations that are directed to a particular LUN. Accordingly, the particular host 102 is instructed, using the QFULL message, that it is required to pause IO operations on a particular LUN, but not on a particular compute node or particular port. As such, the QFULL is directed to specific IO operations that are directed to a particular LUN having an associated service level, and do not affect IO operations on other LUNs. Thus, if a particular host 102 is issuing IO operations on two LUNs with different service levels, generating and transmitting a QFULL message to the host that specifies the particular LUN will cause the host to pause IO operations on one of the two LUNS, but will not affect the ability of the host to continue implementing IO operations on the other of the two LUNS.

It should be noted that transmission of the LUN-based QFULL message to the host described herein is not based on the number of IO operations sent by the host to the particular LUN, but is instead based on the service level of the LUN and the overall number of IO operations enqueued at the compute node 116. Depending on the implementation, LUN-based QFULL messages might also be used by a host to shape traffic in other contexts as well. For example, additional LUN based thresholds may be used to prevent a particular host from sending IO operations in excess of the number specified for a given service level. For example, a service level might specify that a given host can send at most 100 IO operations on a given LUN within a given period, e.g., 100 IO operations per second. If the host exceeds the threshold specified by the service level, a LUN-based QFULL may be issued to the host. Accordingly, it should be understood that LUN-based QFULL messages may be used in several different ways by a compute node 116 to shape different aspects of IO traffic from a set of hosts.

FIG. 8 example process of using proactive QFULL messages to implement proactive traffic shaping for traffic having specific service levels based on EMA IO trends, according to some embodiments, according to some embodiments. In particular, FIG. 8 shows some example embodiments used to implement the EMA trend analysis of FIG. 5, block 540, in which the EMA short-term (EMA-ST) and EMA long-term (EMA-LT) trends are used to determine when to send QFULL messages.

As shown in FIG. 8, in some embodiments, after determining the short-term exponential moving average (EMA-ST) and long-term exponential moving average (EMA-LT) (block 800), the QFULL QOS enforcement system 210 compares the short-term exponential moving average and the long-term exponential moving average (block 805). When the short-term exponential moving average (EMA-ST) is greater than the long-term exponential moving average (EMA-LT) (a determination of YES at block 805), the QFULL QOS enforcement system 210 determines that the overall number of IO operations is on an upward trend (block 810). In instances where the depth of the queue is greater than the threshold T (a determination of YES at block 815), and the overall number of IO operations is on an upward trend (a determination of YES at block 805), the QFULL QOS enforcement system 210 generates a QFULL message (block 820). If the number of IO operations in the queue is below the threshold T (a determination of NO at block 815), a QFULL message is not sent (block 825)

When the short-term exponential moving average (EMA-ST) is less than the long-term exponential moving average (EMA-LT) (a determination of NO at block 805), the QFULL QOS enforcement system 210 determines that the overall number of IO operations is on a downward trend (block 830). In some embodiments, when the QFULL QOS enforcement system 210 determines that the overall number of IO operations is on a downward trend (block 830) the QFULL QOS enforcement system 210 will not send a QFULL message. Specifically, as shown in FIG. 8, regardless of whether the depth of queue has breached the threshold T (a determination of either a YES in block 835, or a determination of NO at block 835), in some embodiments the QFULL QOS enforcement system 210 will not send a QFULL message (block 825) when the overall number of IO operations is on a downward trend.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of proactive traffic shaping with service levels, comprising:
    receiving an Input/Output (IO) operation from a host on a Logical Unit Number (LUN) by a compute node;
    determining a service level for the LUN;
    using the determined service level for the LUN to determine a queue threshold, the queue threshold specifying an overall number of IO operations pending in a queue for the compute node above which a QFULL message may be generated;
    comparing a current overall number of IO operations pending in the queue for the compute node with the determined threshold;
    in response to a determination that the current overall number of IO operations pending in the queue for the compute node is above the determined threshold, determining whether the number of IO operations pending in the queue is exhibiting an upward trend or a downward trend;
    in response to a determination that the number of IO operations pending in the queue is exhibiting an upward trend, generating a LUN specific QFULL message, the LUN specific QFULL message identifying the LUN; and
    transmitting the LUN specific QFULL message to the host, the QFULL message instructing the host to temporarily pause sending additional IO operations directed to the LUN to the compute node.

2. The method of claim 1, wherein determining whether the number of IO operations pending in the queue is exhibiting an upward trend or a downward trend comprises:
    generating a short-term exponential moving average (EMA-ST) of the number of IO operations pending in the queue over a first number of monitoring intervals;
    generating a long-term exponential moving average (EMA-LT) of the number of IO operations pending in the queue over a second number of monitoring intervals, the second number of monitoring intervals being larger than the first number of monitoring intervals;
    comparing the EMA-ST with the EMA-LT;
    determining that the number IO operations pending in the queue is exhibiting an upward trend when the EMA-ST is greater than the EMA-LT; and
    determining that the number IO operations pending in the queue is exhibiting a downward trend when the EMA-ST is less than the EMA-LT.

3. The method of claim 1, wherein the queue threshold is a first percentage threshold.

4. The method of claim 1, wherein the queue threshold specifies different thresholds for different service levels.

5. The method of claim 1, in response to a determination that the number of IO operations pending in the queue is above the threshold and is exhibiting a downward trend, not generating the LUN specific QFULL message.

6. The method of claim 1, in response to a determination that the number of IO operations pending in the queue is below the threshold, not generating the LUN specific QFULL message.

7. The method of claim 1, in response to a determination that the service level for the IO LUN is not a low service level, not generating the LUN specific QFULL message.

8. The method of claim 1, further comprising determining whether another compute node has capacity to process subsequent IO operations on the LUN.

9. The method of claim 8, in response to a determination that the current overall number of IO operations pending in the queue for the compute node is above the determined threshold, and that the number of IO operations pending in the queue is exhibiting an upward trend, and that no other compute node has capacity to process subsequent IO operations on the LUN, not generating the LUN specific QFULL message.

10. The method of claim 1, wherein the LUN specific QFULL message instructs the host to temporarily pause sending additional IO operations directed to the LUN to the compute node, but does not instruct the host to temporarily pause sending control IO operations directed to the LUN and does not instruct the host to temporarily pause sending IO operations directed to other LUNs to the compute node.

11. A non-transitory tangible computer readable storage medium having stored thereon a computer program for proactive traffic shaping with service levels, the computer program including a set of instructions which, when executed by a computer, cause the computer to perform a method comprising the steps of:
    receiving an Input/Output (IO) operation from a host on a Logical Unit Number (LUN) by a compute node;
    determining a service level for the LUN;

using the determined service level for the LUN to determine a queue threshold, the queue threshold specifying an overall number of IO operations pending in a queue for the compute node above which a QFULL message may be generated;

comparing a current overall number of IO operations pending in the queue for the compute node with the determined threshold;

in response to a determination that the current overall number of IO operations pending in the queue for the compute node is above the determined threshold, determining whether the number of IO operations pending in the queue is exhibiting an upward trend or a downward trend;

in response to a determination that the number of IO operations pending in the queue is exhibiting an upward trend, generating a LUN specific QFULL message, the LUN specific QFULL message identifying the LUN; and transmitting the LUN specific QFULL message to the host, the QFULL message instructing the host to temporarily pause sending additional IO operations directed to the LUN to the compute node.

12. The non-transitory tangible computer readable storage medium of claim 11, wherein determining whether the number of IO operations pending in the queue is exhibiting an upward trend or a downward trend comprises:

generating a short-term exponential moving average (EMA-ST) of the number of IO operations pending in the queue over a first number of monitoring intervals;

generating a long-term exponential moving average (EMA-LT) of the number of IO operations pending in the queue over a second number of monitoring intervals, the second number of monitoring intervals being larger than the first number of monitoring intervals;

comparing the EMA-ST with the EMA-LT;

determining that the number IO operations pending in the queue is exhibiting an upward trend when the EMA-ST is greater than the EMA-LT; and determining that the number IO operations pending in the queue is exhibiting a downward trend when the EMA-ST is less than the EMA-LT.

13. The non-transitory tangible computer readable storage medium of claim 11, wherein the queue threshold is a first percentage threshold.

14. The non-transitory tangible computer readable storage medium of claim 11, wherein the queue threshold specifies different thresholds for different service levels.

15. The non-transitory tangible computer readable storage medium of claim 11, in response to a determination that the number of IO operations pending in the queue is above the threshold and is exhibiting a downward trend, not generating the LUN specific QFULL message.

16. The non-transitory tangible computer readable storage medium of claim 11, in response to a determination that the number of IO operations pending in the queue is below the threshold, not generating the LUN specific QFULL message.

17. The non-transitory tangible computer readable storage medium of claim 11, in response to a determination that the service level for the IO LUN is not a low service level, not generating the LUN specific QFULL message.

18. The non-transitory tangible computer readable storage medium of claim 11, further comprising determining whether another compute node has capacity to process subsequent IO operations on the LUN.

19. The non-transitory tangible computer readable storage medium of claim 18, in response to a determination that the current overall number of IO operations pending in the queue for the compute node is above the determined threshold, and that the number of IO operations pending in the queue is exhibiting an upward trend, and that no other compute node has capacity to process subsequent IO operations on the LUN, not generating the LUN specific QFULL message.

20. The non-transitory tangible computer readable storage medium of claim 11, wherein the LUN specific QFULL message instructs the host to temporarily pause sending additional IO operations directed to the LUN to the compute node, but does not instruct the host to temporarily pause sending control IO operations directed to the LUN and does not instruct the host to temporarily pause sending IO operations directed to other LUNs to the compute node.

* * * * *